(12) United States Patent
Zhang et al.

(10) Patent No.: US 11,064,496 B2
(45) Date of Patent: Jul. 13, 2021

(54) METHOD AND DEVICE FOR REWARDING WIRELESS ACCESS POINT

(71) Applicant: Shanghai Zhangmen Science and Technology Co., Ltd., Shanghai (CN)

(72) Inventors: FaYou Zhang, Shanghai (CN); XiaoLin Tong, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/257,053

(22) Filed: Jan. 24, 2019

(65) Prior Publication Data
US 2019/0174504 A1 Jun. 6, 2019

Related U.S. Application Data

(63) Continuation of application No. PCT/CN2016/113622, filed on Dec. 30, 2016.

(30) Foreign Application Priority Data

Aug. 2, 2016 (CN) .......................... 201610624563.7

(51) Int. Cl.
*H04W 72/04* (2009.01)
*G06Q 20/00* (2012.01)
(Continued)

(52) U.S. Cl.
CPC ........ *H04W 72/0493* (2013.01); *G06Q 20/00* (2013.01); *G06Q 30/0278* (2013.01);
(Continued)

(58) Field of Classification Search
CPC ... H04W 4/24; H04W 40/24; H04W 72/0493; G06Q 20/00; G06Q 30/0278
See application file for complete search history.

(56) References Cited

U.S. PATENT DOCUMENTS

| 10,062,072 B2* | 8/2018 | Davis .................. G06Q 20/085 |
| 2014/0038548 A1* | 2/2014 | Sato ........................ H04W 4/24 455/406 |

(Continued)

FOREIGN PATENT DOCUMENTS

| CN | 1750037 A | 3/2006 |
| CN | 104700258 A | 6/2015 |

(Continued)

*Primary Examiner* — Rhonda L Murphy
(74) *Attorney, Agent, or Firm* — Bayramoglu Law Offices LLC

(57) ABSTRACT

The objective of the present application is to provide a method, a device, and a system for rewarding a wireless access points. Compared with the prior art, in the present application, after establishing a wireless connection between a user device and a target wireless access point, rewarding prompt information regarding the target wireless access point is presented on the user device. Further, rewarding operation information regarding the target wireless access point submitted by the user according to the rewarding prompt information is sent to a corresponding network device through the wireless connection. Accordingly, the network device receives the rewarding operation information. Further, according to the rewarding operation information, the network device transfers a corresponding rewarding resource from a corresponding account of the user device to a corresponding account of the target wireless access point.

5 Claims, 4 Drawing Sheets

(51) Int. Cl.
*H04W 4/24* (2018.01)
*G06Q 30/02* (2012.01)
*H04M 15/00* (2006.01)
*H04W 76/10* (2018.01)
*H04W 40/24* (2009.01)
*H04W 72/12* (2009.01)
*H04W 88/18* (2009.01)

(52) U.S. Cl.
CPC ......... *H04M 15/8083* (2013.01); *H04W 4/24* (2013.01); *H04W 40/24* (2013.01); *H04W 72/1257* (2013.01); *H04W 76/10* (2018.02); *H04W 88/18* (2013.01)

(56) References Cited

U.S. PATENT DOCUMENTS

| | | | |
|---|---|---|---|
| 2014/0122337 A1 | 5/2014 | Kang | |
| 2017/0116658 A1* | 4/2017 | Baid | ................... G06Q 30/0625 |
| 2018/0343609 A1* | 11/2018 | Gu | ........................ H04W 48/14 |

FOREIGN PATENT DOCUMENTS

| | | |
|---|---|---|
| CN | 104978651 A | 10/2015 |
| CN | 106254110 A | 12/2016 |

* cited by examiner

METHOD AND DEVICE FOR REWARDING WIRELESS ACCESS POINT

CROSS REFERENCE TO RELATED APPLICATIONS

This application is the Continuation application of International Application PCT/CN2016/113622, filed on Dec. 30, 2016, which is based upon and claims priority to Chinese Patent Application No. 201610624563.7, filed on Aug. 2, 2016, the entire contents of which are incorporated herein by reference.

TECHNICAL FIELD

The present application relates to the field of communication network, particularly to a technique for rewarding a wireless access point.

BACKGROUND

With the rapid development of wireless network technology, wireless access points are increasingly used to establish wireless connections in people's daily life. Thus, more and more users have come to expect to give feedback related to the conditions of the wireless access points that they are using, so that the wireless access points in poor condition can be improved or the wireless access points in good condition can be encouraged or rewarded. However, the problem cannot be solved by the existing techniques.

SUMMARY

The objective of the present application is to provide a method, a device, and a system for rewarding a wireless access points.

According to one aspect of the present application, a method for rewarding a wireless access points on a user device is provided. wherein, the method includes:

establishing a wireless connection between the user device and a target wireless access point;

presenting rewarding prompt information regarding the target wireless access point on the user device; and sending rewarding operation information regarding the target wireless access point to a corresponding network device through the wireless connection, wherein the rewarding operation information is submitted by the user according to the rewarding prompt information.

According to another aspect of the present application, a method for rewarding a wireless access points on a network device is provided, wherein, the method includes:

receiving rewarding operation information regarding a target wireless access point submitted by a user device; and transferring a corresponding rewarding resource from a corresponding account of the user device to a corresponding account of the target wireless access point according to the rewarding operation information.

According to another aspect of the present application, a user device for rewarding a wireless access points is provided, wherein, the device includes:

a connecting apparatus, configured to establish a wireless connection between the user device and the target wireless access point;

a prompting apparatus, configured to present rewarding prompt information regarding the target wireless access point on the user device; and a sending apparatus, configured to send rewarding operation information regarding the target wireless access point to a corresponding network device through the wireless connection, wherein the rewarding operation information is submitted by the user according to the rewarding prompt information.

According to yet another aspect of the present application, a network device for rewarding a wireless access points is provided. Specifically, the device includes:

a receiving apparatus, configured to receive rewarding operation information regarding a target wireless access point submitted by a user device; and a transferring apparatus, configured to transfer a corresponding rewarding resource from a corresponding account of the user device to a corresponding account of the target wireless access point according to the rewarding operation information. Compared with the prior art, in the present application, feedback prompt information regarding the target wireless access point to which the user device is connected is presented on the user device, and user feedback information regarding the target wireless access point which is submitted by the user according to the feedback prompt information is sent to the corresponding network device. In this way, users are able to give feedback to the wireless access points, so that the wireless access points in poor condition can be improved or the wireless access points in good condition can be encouraged or rewarded. Moreover, owners will be encouraged to share their wireless access points.

Furthermore, according to the present application, the feedback prompt information and the historical feedback information can also be presented on the user device. In detail, the user information of historical users corresponding to the historical feedback information is presented according to the connection status between the historical user and the target wireless access point. In this way, the user using the target wireless access point not only can acquire the feedback information given to the wireless access point by other historical users, but also can learn the connection status between the historical users and the target wireless access point. Thus, it is convenient for the user to communicate with the historical users.

Furthermore, according to the present application, first interaction information sent to the historical user corresponding to the historical feedback information by the user can be acquired. Then, the first interaction information is sent to the network device. Further, the first interaction information is sent to the historical user by the network device. In this way, an information exchange among users who have given feedback can be realized, thereby realizing an information sharing, and improving the user experience.

In addition, according to the present application, after the wireless connection between the user device and the target wireless access point is established, the rewarding prompt information regarding the target wireless access point is presented on the user device. Further, the rewarding operation information regarding the target wireless access point, which is submitted by the user according to the rewarding prompt information, is sent to the corresponding network device through the wireless connection. Accordingly, the network device receives the rewarding operation information. Further, according to the rewarding operation information, the corresponding issued resource is transferred from the corresponding account of the user device to the corresponding account of the target wireless access point by the network device. In this way, the rewarding to the target wireless access point to which the user is connected can be realized. Also, it is convenient, fast, and can encourage owners to share their wireless access points.

BRIEF DESCRIPTION OF THE DRAWINGS

By reading the detailed description of the nonrestrictive embodiments with reference to the following drawings, other features, objectives, and advantages of the present invention will become clearer.

Figure 1:
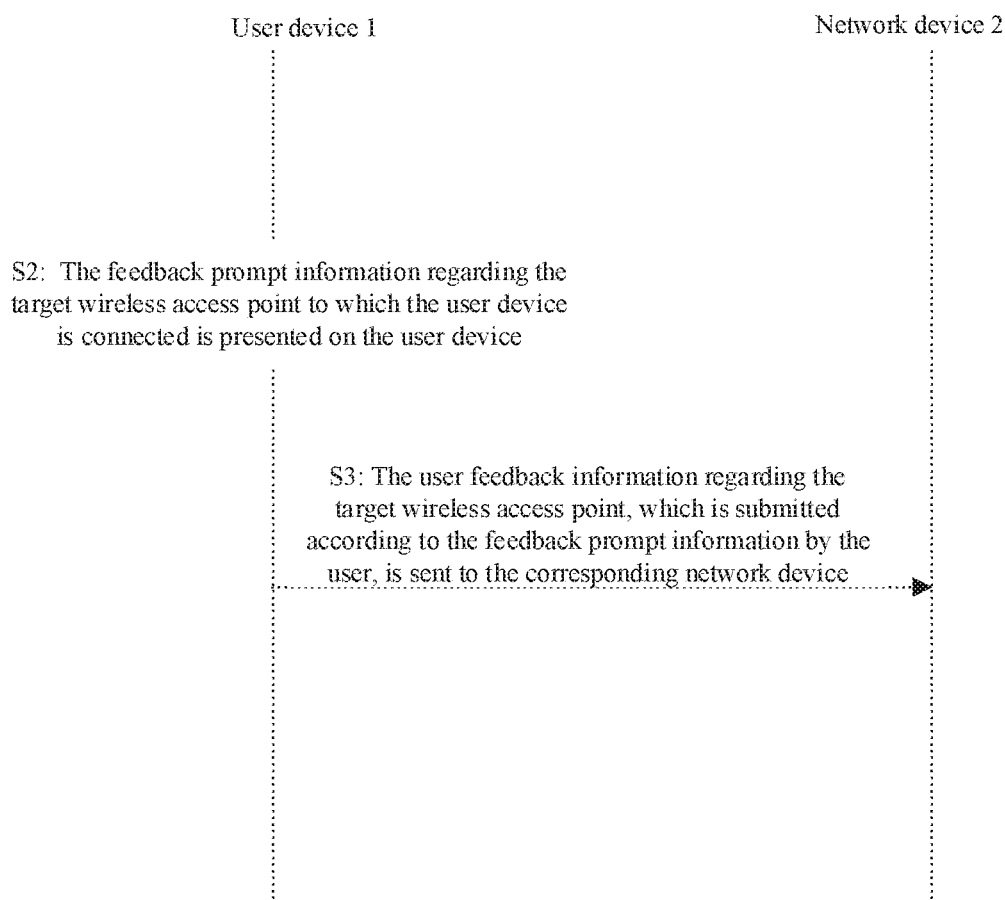
FIG. 1 shows a flowchart of a method for acquiring user feedback information of a wireless access point according to one aspect of the present application.

Identical or similar reference designators in the drawings represent same or similar components.

DETAILED DESCRIPTION OF THE EMBODIMENTS

The present invention will be further described in detail in combination with the drawings.

In a representative configuration of the present application, equipment of termination and service network and trustees each includes one or more central processing units (CPU), input/output interfaces, network interfaces and memories.

Memories may include non-permanent memory, random access memory (RAM) and/or non-volatile memory and other forms pertaining to computer readable media. For example, read-only memory (ROM) or flash memory (flash RAM). Memories are the examples of computer readable media.

Computer readable media, including permanent and non-permanent media, removable and non-removable media, can realize information storage by any method or technique. The information may be computer readable instructions, data structures, program modules, or other data. Examples of computer storage media include, but are not limited to, phase-change random access memory (PRAM), static random access memory (SRAM), dynamic random access memory (DRAM), other types of random access memory (RAM), read-only memory (ROM), electrically erasable programmable read-only memory (EEPROM), flash memory or other type of memory, compact disk read-only memory (CD-ROM), digital versatile disk (DVD) or other optical storages, magnetic tape cartridge, tape or disk storage or other magnetic storage device, or any other non-transportable medium which can be configured to store information that can be accessed by a computing device. As defined herein, computer readable media do not include non-transitory computer readable media, such as modulated data signals and carrier waves.

FIG. 1 shows a flowchart of a method for acquiring user feedback information for a wireless access point on a network device and a user device according to one aspect of the present application. The user device 1 and the network device 2 coordinate with each other to acquire the user feedback information for the wireless access point.

Specifically, in step S2, feedback prompt information regarding the target wireless access point to which the user device 1 is connected is presented on the user device 1. Further, in step S3, the user feedback information regarding the target wireless access point which is submitted by the user according to the feedback prompt information is sent to the network device 2 by the user device 1. Accordingly, the network device 2 receives the user feedback information. Preferably, the feedback prompt information includes the rewarding prompt information regarding the target wireless access point. The user feedback information includes rewarding operation information regarding the target wireless access point which is submitted by the user according to the rewarding prompt information.

In the embodiment, preferably, the method further includes: S1 (not shown), receiving the feedback prompt information regarding the target wireless access point sent by the corresponding network device 2 through the wireless connection between the user device 1 and the target wireless access point. Herein, the network device 2 includes but is not limited to a computer, a network host, a single network server, a cloud which consists of multiple network server sets or multiple servers. Herein, the cloud consists of a mass of computers or network servers based on cloud computing. Wherein, the cloud computing is one kind of distributed computing, and the cloud is a virtual supercomputer which consists of a group of loosely coupled computer sets. The user device 1 includes but is not limited to any type of mobile electronic product that can perform man-machine interaction with users by a touch panel, such as smart phones, tablet computers, etc. The mobile electronic products may adopt any operating system, such as android operating system, iOS operating system, etc. Those skilled in the art should be able to understand that the user device 1 and the network device 2 mentioned above are merely examples. Other network devices that are currently available or may be developed in the future, if applicable to the present application, should also be included in the scope of the present application and are herein incorporated by reference. In detail, the feedback prompt information can be used to prompt the user to give corresponding feedback to the target wireless access point. For example, the feedback prompt information may be a rewarding page for the user to reward the target wireless access point. Further, the rewarding includes paying a certain amount of money to the provider of the target wireless access point, or giving a like or grade to the target wireless access point, etc. Herein, the rewarding page includes but is not limited to a rewarding button for a fixed amount of money, a like button, a grade input box, a money amount input box for rewarding, etc. Specifically, the network device 2 sends the feedback prompt information regarding the target wireless access point to the user device 1 through the wireless connection established between the user device 1 and the network device 2 according to respective communication protocol. Accordingly, the user device 1 receives the feedback prompt information.

Still, according to the embodiment, in the step S2, the feedback prompt information regarding the target wireless access point to which the user device 1 is connected is presented on the user device 1. Herein, after the user device 1 receives the feedback prompt information regarding the target wireless access point sent by the network device 2, the feedback prompt information is presented on the user device 1 for the user using the user device 1 to operate accordingly. For example, the feedback prompt information is a rewarding page, and rewarding buttons for paying one yuan, five yuan, or other amounts of money is set on the page. When the user wants to reward the target wireless access point by paying money, the user can directly click on respective rewarding button to realize the payment and rewarding the target wireless access point. For another example, the feedback prompt information may be a rewarding page for a fixed amount of money, for instance, a rewarding button for paying five yuan is set on the page, i.e. for all users who want to reward, they only need to click on the button, and the target wireless access point gets rewarded with five yuan. For another example, in the rewarding page, the user can reward the target wireless access point with different amount of money according to their desires. For instance, the user can input a desired amount of money to reward the target wireless access point manually. Herein, the amount of money mentioned above is merely an example and not intended to limit the present application. Preferably, the step S2 includes: when predetermined feedback triggering conditions are satisfied, presenting the feedback prompt information on the user device 1. Wherein, the feedback triggering conditions include at least one of the following conditions: 1) the accumulated duration of the user device 1 being connected to the target wireless access point is equal to or greater than a predetermined usage duration threshold; 2) the accumulated communication data usage of the user device 1 through the wireless connection is equal to or greater than a predetermined data usage threshold; 3) an application that communicates through the wireless connection is opened on the user device 1; 4) an application that communicates through the wireless connection is closed on the user device 1. In the present embodiment, only when some of the triggering conditions are satisfied, will the feedback prompt information be presented on the user device 1. For example, for condition 1), only when the accumulated duration of the user device 1 being connected to the target wireless access point is equal to or greater than a predetermined usage duration threshold, will the feedback prompt information be presented on the user device 1. For instance, when the accumulated duration of the user device 1 which is connected to the target wireless access point is greater than half an hour, the feedback prompt information may be presented on the user device 1. In this way, the user can have a better understanding of the status of the wireless access point, and a more suitable comment will be given to the wireless access point by the user, thereby better improving the user experience. For condition 2), only when the accumulated communication data usage of the user device 1 through the wireless connection is equal to or greater than a predetermined data usage threshold, will the feedback prompt information be presented on the user device 1. The triggering condition 2) is similar to the triggering condition 1), namely, only when the user has a better understanding of the status of the target wireless access point, will the feedback prompt information be presented. For condition 3), an application that communicates through the wireless connection is opened on the user device 1, for instance, when the user opens the application that communicates through the wireless connection, it indicates that the user device 1 is able to perform communication activities normally through the target wireless access point, so that the feedback prompt information can be presented. For condition 4), when the user closes the application that communicates through the wireless connection on the user device 1, it indicates that the user has already performed communication activities by the application, i.e. the user is able to get to know the connection status of the target wireless access point, so that the feedback prompt information can be presented.

Still, according to the embodiment, in the step S3, the user device 1 sends the user feedback information regarding the target wireless access point, which is submitted according to the feedback prompt information by the user, to the corresponding network device 2. Accordingly, the network device 2 receives the user feedback information. Preferably, the feedback information includes at least one of the following: usage evaluation information to the target wireless access point; and payment information to the target wireless access point. Herein, the user feedback information corresponds to the feedback prompt information. For example, if the feedback prompt information is the rewarding page, and a user can pay money to reward the target wireless access point, give a like or a grade etc. to the target wireless access point on the page, then the corresponding user feedback information may include the amount of money, giving a like or grade etc.

Preferably, the step S1 includes the following steps. S11 (not shown): after the wireless connection between the user device 1 and the target wireless access point is successfully established, the user device 1 sends, to the corresponding network device 2, successful connection information indicating a successful connection to the target wireless access point through the wireless connection. Accordingly, the network device 2 receives the successful connection information. S12 (not shown): based on the successful connection information, the network device 2 sends the feedback prompt information regarding the target wireless access point to the user device. Accordingly, the user device 1 receives the feedback prompt information. In the present embodiment, only when the user device 1 is successfully connected to the target wireless access point, will the network device 2 send the feedback prompt information to the user device 1. Herein, in step S11, the user device 1 may first send, to the corresponding network device 2, the successful connection information indicating a successful connection to the target wireless access point according to respective communication protocol through the wireless connection. Accordingly, the network device 2 receives the successful connection information. Further, in step S12, based on the successful connection information, the network device 2 sends the feedback prompt information regarding the target wireless access point to the user device. Accordingly, the user device 1 receives the feedback prompt information.

Preferably, the step S1 further includes step S13 (not shown): the network device 2 sends historical feedback information regarding the target wireless access point to the user device 1 through the wireless connection. Accordingly, the user device 1 receives the historical feedback information. Wherein, the step S2 includes: presenting the feedback prompt information and the historical feedback information on the user device 1. In detail, the historical feedback information includes user feedback information given to the target wireless access point by other users before the current user gives feedback information. In the present embodiment, in order to let the user be aware of the feedback information given to the target wireless access point by other users, the feedback prompt information and the historical feedback information are provided to the user together. For example, the feedback prompt information is the rewarding page. On the rewarding page, the payment information of rewarding the target wireless access point by other users is presented. For instance, a user account picture of corresponding historical feedback information and an amount of money payed for rewarding the target wireless access point or information of giving a like to the target wireless access point and so on are presented. More preferably, the step S2 includes: presenting the feedback prompt information and the historical feedback information on the user device 1. Wherein, user information of historical users corresponding to the historical feedback information is presented according to the connection status between the historical users and the target wireless access point. Herein, the connection status includes connected or disconnected. Those skilled in the art should be able to understand that when the user device 1 is successfully connected to the target wireless access point, users corresponding to the historical feedback information may be successfully connected or fail to connect to the target wireless access point at present. Thus, these two statuses may be presented distinguishably. For example, the account pictures of historical users that are successfully connected to the target wireless access point at present are presented normally, while account pictures of historical users that fail to connect to the target wireless access point at present are presented in grey, so as to make it easier for the users to check. Herein, the presentation ways are merely taken for examples. Other presentation ways that are currently available or may appear in the future, if applicable to the present application, should also be included in the scope of the present application and are herein incorporated by reference.

Preferably, the method further includes the following steps. S4 (not shown): the user device 1 acquires first interaction information with a historical user corresponding to the historical feedback information by the user. S5 (not shown): the user device 1 sends the first interaction information to the network device 2, and accordingly, the network device 2 receives the first interaction information. S6 (not shown): the network device 2 provides the first interaction information to a device of the historical user. According to the present embodiment, in the step S4, the user device 1 acquires the first interaction information with the historical user corresponding to the historical feedback information. Herein, the user and the historical user can interact with each other. The interaction method includes but is not limited to webpage interaction, communication software interaction and the like. For example, the user and the historical user may interact with each other directly on the rewarding page, or they may interact with each other by adding friends with communication software. Herein, whether the user and the historical user add each other as friend or not, they can interact with each other. Thus, in the step S5, the user device 1 sends the first interaction information to the network device 2. Accordingly, the network device 2 receives the first interaction information. Further, in the step S6, the network device 2 provides the first interaction information to the device corresponding to the historical user to realize the information interaction between the user and the historical user.

More preferably, the step S5 includes: the user device 1 sending the first interaction information to the network device 2 when the connection status between the historical user and the target wireless access point is stay connected. Accordingly, the network device 2 receives the first interaction information. Further, the step S6 includes: providing the first interaction information to the device corresponding to the historical user when the connection status between the historical user and the target wireless access point is stay connected. In the present embodiment, only when the connection status between the historical user and the target wireless access point is stay connected, will the user interact with the historical user. Thus, in the step S5, when the connection status between the historical user and the target wireless access point is stay connected, the user device 1 sends the first interaction information to the network device 2 according to respective communication protocol through the wireless connection established between the network device 2 and the user device 1. Further, the network device 2 sends the first interaction information to the device corresponding to the historical user to realize the information interaction between the user and the historical user. More preferably, the method further includes the following step S7 (not shown): the first interaction information is ignored and reported to the user when the connection status between the historical user and the target wireless access point is disconnected. In the present embodiment, when the step S7 is implemented on the user device 1, and when the user device 1 acquires the first interaction information with the historical user submitted by the current user, the connection status between the historical user and the target wireless access point can be detected to check whether the connection is disconnected. When the connection is disconnected, the first interaction information can be ignored and reported to the user. For example, the user can be notified that the historical user is off-line or the first interaction information is undeliverable, etc. When the step S7 is implemented on the network device 2, the network device 2 can detect whether the connection status between the historical user and the target wireless access point to check whether the connection is disconnected. When the connection is disconnected, the first interaction information can be ignored and reported to the user.

Figure 2:
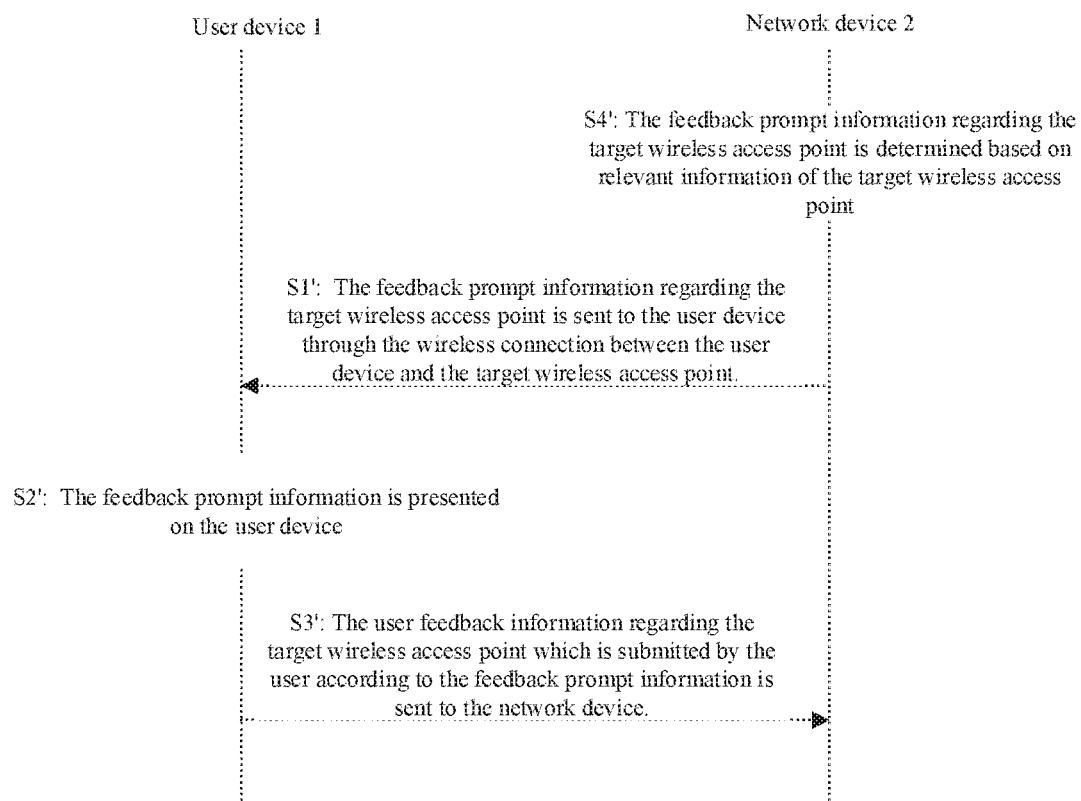
FIG. 2 shows a flowchart of a method for acquiring user feedback information of a wireless access point according to one preferred embodiment of the present application.

In a preferred embodiment, as shown in FIG. 2, steps S1', S2', and S3' are identical or basically the same as the steps S1, S2, and S3 in the embodiment shown in FIG. 1, thus the steps S1', S2', and S3' are not repeated herein, and are merely incorporated herein by reference. Preferably, the method further includes: the network device 2 determining the feedback prompt information regarding the target wireless access point based on relevant information of the target wireless access point. Wherein, the step S1' includes: the network device 2 sending the feedback prompt information to the user device 1 through the wireless connection between the user device 1 and the target wireless access point. Preferably, the relevant information of the target wireless access point includes at least one of the following: bandwidth information of the target wireless access point; security information of the target wireless access point; historical feedback information of the target wireless access point; and current connection quantity information of the target wireless access point. In the present embodiment, the network device 2 first determines the feedback prompt information regarding the target wireless access point according to the relevant information of the target wireless access point, i.e. different feedback prompt information is matched for respective wireless access point according to the relevant information of each wireless access point. For example, the network device 2 may perform comprehensive evaluation on the target wireless access point according to the bandwidth information, security information, historical feedback information, current connection quantity information, and the like of the target wireless access point. The network device 2 may contain the comprehensive evaluation information in the feedback prompt information regarding the target wireless access point, or directly configure different feedback prompt information according to the comprehensive evaluation information. For example, if the feedback prompt information contains the rewarding button, the amount of money for rewarding the wireless access point with higher comprehensive evaluation is configured to be relatively higher, and the amount of money for rewarding the wireless access point with lower comprehensive evaluation is configured to be relatively lower. For example, a rewarding button for ten yuan may be configured for the wireless access point with higher comprehensive evaluation, and a rewarding button for five yuan may be configured for the wireless access point with lower comprehensive evaluation, etc. The rewarding page may be configured in real time according to the real-time relevant information of the access point, or may be configured according to historical relevant information of the access point. Herein, the amount of money for rewarding is merely an example and not intended to limit the present application. Or, the relevant information of the target wireless access point is directly contained in the feedback prompt information for user's reference.

Preferably, the method further includes the following steps. S5' (not shown): the network device 2 sends feedback response information to the user device 1 based on the user feedback information. Accordingly, the user device 1 receives the feedback response information returned by the network device 2 based on the user feedback information. S6' (not shown): the feedback prompt information is updated and presented on the user device 1 according to the feedback response information. In the present embodiment, in the step S5', after the network device 2 receives the user feedback information sent by the user device 1, the corresponding feedback response information is sent to the user device 1. Further, in the step S6', the feedback prompt information is updated and presented on the user device 1 according to the feedback response information. For example, the feedback response information is successful receiving, or the latest feedback prompt information after receiving the user feedback information sent by the user device 1. For example, if the feedback prompt information is the rewarding page, while the user account picture will be shown on the rewarding page after the feedback response information is successfully sent to the network device 2 by the user, then, after the user successfully rewards the wireless access point, the user account picture will be shown on the rewarding page, and other users may also submit user feedback information at the same period of time. Thus, the user device 1 may update and present the rewarding page.

Figure 3:
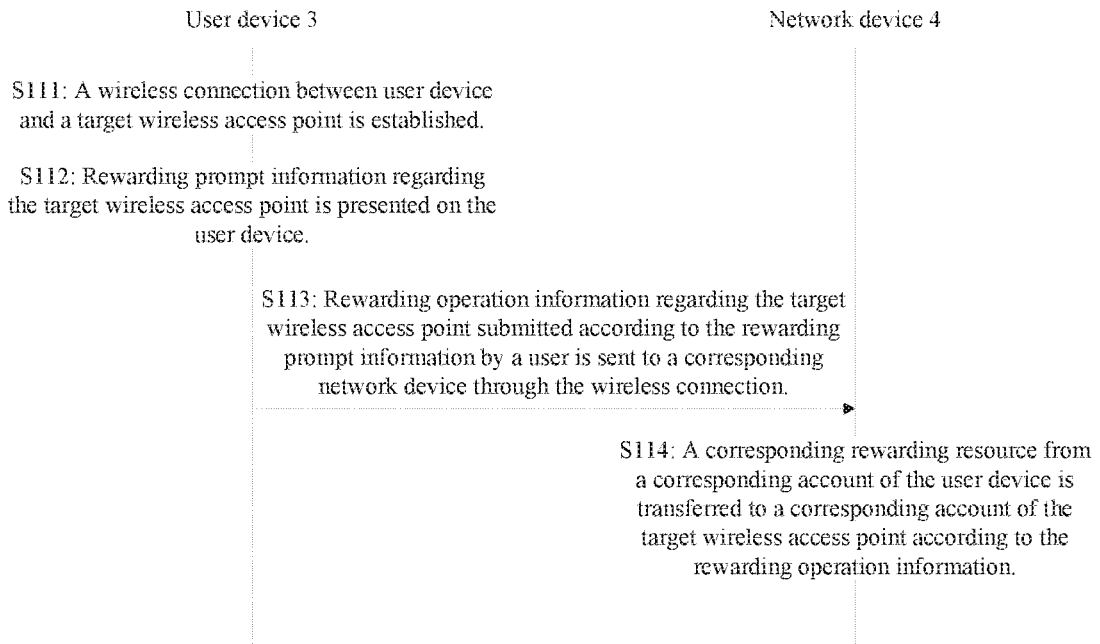
FIG. 3 shows a flowchart of a method for rewarding a wireless access point according to another aspect of the present application.

As shown in FIG. 3, according to another aspect of the present application, a method for rewarding a wireless access point on a user device 3 and a network device 4 is provided. Wherein, the user device 3 and the network device 4 coordinate with each other to realize the rewarding of the wireless access point.

Specifically, in step S111, a wireless connection between the user device 3 and the target wireless access point is established. Further, in step S112, the rewarding prompt information regarding the target wireless access point is presented on the user device 3. Further, in step S113, the user device 3 sends the rewarding operation information regarding the target wireless access point submitted according to the rewarding prompt information by the user to a corresponding network device 4 through the wireless connection. Accordingly, the network device 4 receives the rewarding operation information regarding the target wireless access point submitted by the user device 3. Further, in step S114, the network device 4 transfers corresponding rewarding resource from a corresponding account of the user device 3 to a corresponding account of the target wireless access point according to the rewarding operation information.

In the present embodiment, in the step S111, the wireless connection between the user device 3 and the target wireless access point is established. Herein, the user device 3 includes but is not limited to any type of mobile electronic product that can perform man-machine interaction with the users by a touch panel, such as smart phones, tablet computers, etc. The mobile electronic products may adopt any operating system, such as android operating system, iOS operating system, etc. The user device 3 can establish a wireless connection to a wireless access point. Further, in the step S112, the rewarding prompt information regarding the target wireless access point is presented on the user device 3. Herein, the rewarding prompt information is configured to prompt the user to reward the target wireless access point. For example, the rewarding prompt information is a rewarding button, and the rewarding button may be configured with a predetermined amount of money in advance. The user may reward the target wireless access point with corresponding amount of money by the rewarding button. For instance, the rewarding prompt information is a rewarding button for ten yuan, and the user can reward the target wireless access point with ten yuan merely by clicking the rewarding button. Or, the rewarding prompt information may enable the user to input corresponding amount of money manually to reward the target wireless access point.

Preferably, the method further includes the following step S115 (not shown): the user device 3 sends, to the corresponding network device 4, successful connection information indicating a successful connection to the target wireless access point through the wireless connection. Accordingly, the network device 4 receives the successful connection information. Further, in step S116 (not shown), the rewarding prompt information regarding the target wireless access point is sent to the user device based on the successful connection information. Accordingly, the user device 3 receives the rewarding prompt information. Wherein the step S112 includes: presenting the feedback prompt information on the user device 3. Specifically, in the step S115, after a wireless connection is established between the user device 3 and the target wireless access point, the successful connection information may be sent to the network device 4. After the network device 4 receives the information, the network device 4 sends the rewarding prompt information regarding the target wireless access point to the user device 3. Specifically, the network device 4 sends the rewarding prompt information to the user device 3 according to respective communication protocol through the wireless connection established between the user device 3 and the network device 4.

Further, in the step S113, the user device 3 sends the rewarding operation information regarding the target wireless access point submitted according to the rewarding prompt information by the user to a corresponding network device 4 through the wireless connection. Accordingly, the network device 4 receives the rewarding operation information regarding the target wireless access point submitted by the user device 3. Herein, the network device 4 includes but is not limited to a computer, a network host, a single network server, a cloud which consists of multiple network server sets or multiple servers. Herein, the cloud consists of a mass of computers or network servers based on cloud computing. Specifically, the cloud computing is one kind of distributed computing, and the cloud is a virtual supercomputer which consists of a group of loosely coupled computer sets. Wherein the rewarding operation information includes a specific rewarding resource of a corresponding user for notifying the network device 4, and attribute information corresponding to the user, such as information related to the amount of money rewarded by the user and the user account information, etc.

Further, in the step S114, the network device 4 transfers the corresponding rewarding resource from the corresponding account of the user device 3 to the corresponding account of the target wireless access point according to the rewarding operation information. Wherein, the rewarding resource includes information of rewarding the target wireless access point by the user. For example, the rewarding resource is five yuan. Specifically, for example, a user rewards the target wireless access point with five yuan. Accordingly, after receiving the rewarding operation information, the network device 4 will transfer five yuan from the user's account corresponding to the user device 3 to the corresponding account of the target wireless access point to achieve the rewarding of the target wireless access point. Herein, the account corresponding to the user and the account corresponding to the target wireless access point may be tied with the network device 4 in advance. When the user is rewarding the target wireless access point, after receiving the corresponding rewarding resource submitted by the user, the network device 4 will deduct corresponding amount of money from the account corresponding to the user and then transferred the amount of money to the account corresponding to the target wireless access point.

Preferably, the step S114 includes the following steps. S1141 (not shown): the network device 4 sends a resource transferring prompt information to the user device 3 according to the rewarding operation information. Wherein, the resource transferring prompt information includes the rewarding resource corresponding to the rewarding operation information and the corresponding account of the target wireless access point used to receive the rewarding resource. Accordingly, the user device 3 receives the resource transferring prompt information. Specifically, the resource transferring prompt information is used to prompt the user corresponding to the user device 3 that the rewarding resource is to be transferred. For example, when a user rewarded the target wireless access point with five yuan, the network device 4 may prompt the user that five yuan will be transferred from the user's account to the corresponding account of the target wireless access point. Further, in step S1142 (not shown), the user device 3 sends confirmation information regarding the resource transferring prompt information from the user to the network device 4 through the wireless connection. Specifically, the confirmation information is used to confirm the corresponding resource transferring prompt information to ensure the security of the user's account. For example, the confirmation information is "Transferring five yuan to the account of the target wireless access point, Yes or No?" the user may click on either "Yes" or "No" according to the actual situation. Further, in step S1143 (not shown), after the confirmation information regarding the resource transferring prompt information submitted by the user device 3 is received, the network device 4 transfers the rewarding resource from the corresponding account of the user device to the corresponding account of the target wireless access point. For example, after a user rewarded the target wireless access point with ten yuan, the network device 4 will notify the user to confirm whether to transfer ten yuan from the account of the user to the account corresponding to the target wireless access point. After confirming by the user, the network device 4 transfers ten yuan from the account of the user to the account corresponding to the target wireless access point.

Compared with the prior art, according to the present application, feedback prompt information regarding the target wireless access point to which the user device is connected is presented on the user device, and the user feedback information regarding the target wireless access point, which is submitted according to the feedback prompt information by the user, is sent to the corresponding network device. In this way, users are able to give feedback to the wireless access points, so that the wireless access points in poor condition can be improved or the wireless access points in good condition can be encouraged or rewarded. Also, owners will be encouraged to share their wireless access points.

Furthermore, according to the present application, the feedback prompt information and the historical feedback information can also be presented on the user device. Wherein, user information of historical users corresponding to the historical feedback information is displayed according to the connection status between the historical users and the target wireless access point. In this way, the user using the target access point not only can acquire the feedback information given to the wireless access point by other historical users, but also can learn the connection status between the historical users and the target wireless access point, so as to facilitate the communication with the historical users.

Furthermore, according to the present application, first interaction information sent to the historical user corresponding to the historical feedback information by the user may further be acquired. Then, the first interaction information is sent to the network device. Further, the first interaction information is sent to the historical user by the network device. In this way, an exchange of information among users gave feedback and an information sharing are realized, thereby better improving the user experience.

In addition, according to the present application, after the wireless connection between the user device and the target wireless access point is established, the rewarding prompt information regarding the target wireless access point is presented on the user device. Further, the rewarding operation information regarding the target wireless access point submitted by the user according to the rewarding prompt information is sent to the corresponding network device through the wireless connection. Accordingly, the network device receives the rewarding operation information. Further, according to the rewarding operation information, the corresponding rewarding resource is transferred from the corresponding account of the user device to the corresponding account of the target wireless access point by the network device. In this way, the user can reward the target wireless access point that is connected by the user, and it is convenient and fast. Also, the owners are encouraged to share their wireless access points.

Figure 4:
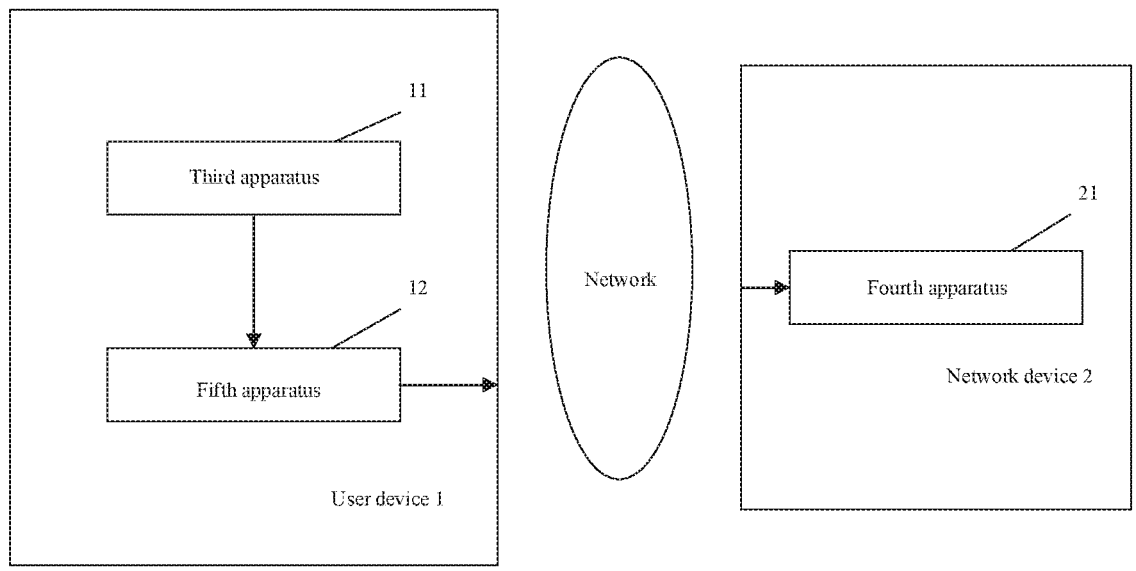
FIG. 4 is a schematic diagram showing a device for acquiring user feedback information of a wireless access point according to another aspect of the present application.

FIG. 4 shows a schematic diagram of a device for acquiring the user feedback information of the wireless access point at the network device end and the user device end according to another aspect of the present application. The user device 1 and the network device 2 coordinate with each other to acquire the user feedback information of the wireless access point.

Specifically, a second apparatus of the network device 2 sends the feedback prompt information regarding the target wireless access point to the user device 1 through the wireless connection between the user device 1 and the network device 2. Accordingly, a first apparatus of the user device 1 receives the feedback prompt information. Further, a third apparatus of the user device 1 presents the feedback prompt information on the user device 1. Further, a fifth apparatus of the user device 1 sends the user feedback information regarding the target wireless access point, which is submitted according to the feedback prompt information by the user, to the network device 2. Accordingly, a fourth apparatus of the network device 2 receives the user feedback information.

In the present embodiment, the second apparatus of the network device 2 sends the feedback prompt information regarding the target wireless access point to the user device 1 through the wireless connection between the user device 1 and the target wireless access point. Herein, the network device 2 includes but is not limited to a computer, a network host, a single network server, a cloud which consists of multiple network server sets or multiple servers. Herein, the cloud consists of a mass of computers or network servers based on cloud computing. Wherein, the cloud computing is one kind of distributed computing, and the cloud is a virtual supercomputer which consists of a group of loosely coupled computer sets. The user device 1 includes but is not limited to any type of mobile electronic product that can perform man-machine interaction with users by a touch panel, such as smart phones, tablet computers, etc. The mobile electronic products may adopt any operating system, such as android operating system, iOS operating system, etc. Those skilled in the art should be able to understand that the user device 1 and the network device 2 mentioned above are merely taken as examples. Other network devices that are currently available or may be developed in the future, if applicable to the present application, should also be included in the scope of the present application and are herein incorporated by reference. In detail, the feedback prompt information can be used to prompt the user to give corresponding feedback to the target wireless access point. For example, the feedback prompt information may be a rewarding page for the user to reward the target wireless access point. Further, the rewarding includes paying a certain amount of money to the provider of the target wireless access point, or giving a like or grade to the target wireless access point, etc. Herein, the rewarding page includes but is not limited to a rewarding button for a fixed amount of money, a like button, a grade input box, a money amount input box for rewarding, etc. Specifically, the second apparatus of the network device 2 sends the feedback prompt information regarding the target wireless access point to the user device 1 through the wireless connection established between the user device 1 and the network device 2 according to respective communication protocol. Accordingly, the first apparatus of the user device 1 receives the feedback prompt information.

Still, according to the embodiment, the third apparatus of the user device 1 presents the feedback prompt information on the user device 1. Herein, after the first apparatus of the user device 1 receives the feedback prompt information regarding the target wireless access point sent by the network device 2, the third apparatus of the user device 1 presents the feedback prompt information on the user device 1 for the user using the user device 1 to operate accordingly. For example, the feedback prompt information is the rewarding page, and rewarding buttons for paying one yuan, five yuan, or other amounts are set on the page; when the user wants to reward the target wireless access point, the user can directly click on respective rewarding button to realize the payment and rewarding the target wireless access point. For another example, the feedback prompt information may be a rewarding page for a fixed amount of money, for instance, a rewarding button for paying five yuan is set on the page, i.e. for all users who want to reward, they only need to click on the button, and the target wireless access point gets rewarded with five yuan. For another example, in the rewarding page, the user can reward the target wireless access point with different amount of money according to their desires. For instance, the user can input a desired amount of money to reward the target wireless access point, manually. Herein, the amount of money mentioned above is merely an example and not intended to limit the present application. Preferably, the third apparatus is configured to present the feedback prompt information on the user device 1 when predetermined feedback triggering conditions are satisfied. Wherein, the feedback triggering conditions include at least one of the following conditions: 1) the accumulated duration of the user device 1 being connected to the target wireless access point is equal to or greater than a predetermined usage duration threshold; 2) the accumulated communication data usage of the user device 1 through the wireless connection is equal to or greater than a predetermined data usage threshold; 3) an application that communicates through the wireless connection is opened on the user device 1; 4) an application that communicates through the wireless connection is closed on the user device 1. In the present embodiment, only when some of the triggering conditions are satisfied, will the feedback prompt information be presented on the user device 1. For example, for condition 1), only when the accumulated duration of the user device 1 being connected to the target wireless access point is equal to or greater than a predetermined usage duration threshold, will the feedback prompt information be presented on the user device 1. For instance, when the accumulated duration of the user device 1 being connected to the target wireless access point is greater than half an hour, the feedback prompt information can be presented on the user device 1. In this way, the user can have a better understanding of the status of the wireless access point, and a more suitable comment will be given to the wireless access point by the user, thereby better improving the user experience. For condition 2), only when the accumulated communication data usage of the user device 1 through the wireless connection is equal to or greater than a predetermined data usage threshold, will the feedback prompt information be presented on the user device 1. The triggering condition 2) is similar to the triggering condition 1), namely, only when the user has a better understanding of the status of the target wireless access point, will the feedback prompt information be presented. For condition 3), an application that communicates through the wireless connection is opened on the user device 1, for instance, when the user opens the application that communicates through the wireless connection, it indicates that the user device 1 is able to perform communication activities normally through the target wireless access point, so that the feedback prompt information can be presented. For condition 4), when the user closes the application that communicates through the wireless connection on the user device 1, it indicates that the user has already performed communication activities by the application, i.e. the user is able to get to know the connection status of the target wireless access point, so that the feedback prompt information can be presented.

Still, according to the embodiment, the fifth apparatus of the user device 1 sends the user feedback information regarding the target wireless access point, which is submitted according to the feedback prompt information by the user, to the network device 2. Accordingly, the fourth apparatus of the network device 2 receives the user feedback information. Preferably, the feedback information includes at least one of the following: usage evaluation information to the target wireless access point; and payment information to the target wireless access point. Herein, the user feedback information corresponds to the feedback prompt information. For example, if the feedback prompt information is the rewarding page, and a user can pay money to reward the target wireless access point, give a like or a grade etc. to the target wireless access point on the page, then the corresponding user feedback information may include the amount of money, feedback information of giving a like, and grade information etc.

Preferably, the first apparatus includes a first unit and a third unit, the second apparatus includes a second unit and a fourth unit. Specifically, after the wireless connection between the user device 1 and the target wireless access point is successfully established, the first unit (not shown) of the first apparatus of the user device 1 is configured to send, to the corresponding network device 2, successful connection information indicating a successful connection to the target wireless access point through the wireless connection. Accordingly, the second unit of the second apparatus of the network device 2 receives the successful connection information. The fourth unit (not shown) is configured to send the feedback prompt information regarding the target wireless access point to the user device based on the successful connection information. Accordingly, the third unit of the user device 1 receives the feedback prompt information. In the present embodiment, only when the user device 1 is successfully connected to the target wireless access point, will the network device 2 send the feedback prompt information to the user device 1. Herein, the first unit of the user device 1 may first send, to the corresponding network device 2, the successful connection information indicating a successful connection to the target wireless access point according to respective communication protocol through the wireless connection. Accordingly, the second unit of the network device 2 receives the successful connection information. Further, based on the successful connection information, the fourth unit of the network device 2 sends the feedback prompt information regarding the target wireless access point to the user device. Accordingly, the third unit of the user device 1 receives the feedback prompt information.

Preferably, the second apparatus further includes: a sixth unit (not shown). The sixth unit of the network device 2 sends historical feedback information regarding the target wireless access point to the user device 1 through the wireless connection. Accordingly, the fifth unit of the user device 1 receives the historical feedback information. Wherein, the third apparatus is configured to present the feedback prompt information and the historical feedback information on the user device 1. The historical feedback information includes the user feedback information given to the target wireless access point by other users before the current user gives feedback information. In the present embodiment, in order to let the user be aware of the feedback information given to the target wireless access point by other users, the feedback prompt information and the historical feedback information are provided to the user together. For example, the feedback prompt information is the rewarding page. On the rewarding page, the payment information for rewarding the target wireless access point by other users is presented. For instance, a user account picture of corresponding historical feedback information and an amount of money payed for rewarding the target wireless access point or information of giving a like to the target wireless access point and so on are presented. More preferably, the third apparatus is configured to present the feedback prompt information and the historical feedback information on the user device 1. Wherein, user information of historical users corresponding to the historical feedback information is presented according to the connection status between the historical users and the target wireless access point. Herein, the connection status includes connected or not connected. Those skilled in the art should be able to understand that when the user device 1 is successfully connected to the target wireless access point, users corresponding to the historical feedback information may be successfully connected or fail to connect to the target wireless access point at present. Thus, these two statuses may be presented, distinguishably. For example, the account pictures of historical users that are successfully connected to the target wireless access point at present are presented normally, while account pictures of historical users that fail to connect to the target wireless access point at present are presented in grey, so as to make it easier for the users to check. Herein, the presentation ways are merely taken for examples. Other presentation ways that are currently available or may appear in the future, if applicable to the present application, should also be included in the scope of the present application and are herein incorporated by reference.

Preferably, wherein, the user device 1 further includes a seventh apparatus (not shown) and a ninth apparatus (not shown). The network device 2 further includes an eighth apparatus (not shown) and a tenth apparatus (not shown). Specifically, the seventh apparatus of the user device 1 is configured to acquire first interaction information with a historical user corresponding to the historical feedback information by the user. The ninth apparatus of the user device 1 is configured to send the first interaction information to the network device 2. Accordingly, the eighth apparatus of the network device 2 receives the first interaction information. The tenth apparatus of the network device 2 provides the first interaction information to a device corresponding to the historical user. In the present embodiment, the seventh apparatus of the user device 1 acquires the first interaction information sent to the historical user corresponding to the historical feedback information by the user. Herein, the user and the historical user can interact with each other. The interaction method includes but is not limited to webpage interaction, communication software interaction and the like. For example, the user and the historical user may interact with each other directly on the rewarding page, or they may interact with each other after adding friends by communication software. Herein, whether the user and the historical user add each other as friend or not, they can interact with each other. Thus, the ninth apparatus of the user device 1 sends the first interaction information to the network device 2. Accordingly, the eighth apparatus of the network device 2 receives the first interaction information. Further, the tenth apparatus of the network device 2 provides the first interaction information to the device corresponding to the historical user to realize the information interaction between the user and the historical user.

More preferably, wherein, the ninth apparatus is configured to send the first interaction information to the network device 2 by the user device 1 when the connection status between the historical user and the target wireless access point is stay connected. Accordingly, the eighth apparatus of the network device 2 receives the first interaction information. Further, the tenth apparatus is configured to provide the first interaction information to the device corresponding to the historical user when the connection status between the historical user and the target wireless access point is stay connected. In the present embodiment, only when the connection status between the historical user and the target wireless access point is stay connected, will the user interact with the historical user. Thus, when the connection status between the historical user and the target wireless access point is stay connected, the ninth apparatus of the user device 1 sends the first interaction information to the network device 2 according to respective communication protocol through the wireless connection established between the network device 2 and the user device 1. Further, the tenth apparatus of the network device 2 sends the first interaction information to the device corresponding to the historical user to realize the information interaction between the user and the historical user. More preferably, the user device further includes an eleventh apparatus, and the network device 2 further includes a twelfth apparatus. In the present embodiment, when the user device 1 acquires the first interaction information with the historical user submitted by the user, the connection status between the historical user and the target wireless access point can be detected to check whether the connection is disconnected. When the connection is disconnected, the first interaction information can be ignored and reported to the user by the eleventh apparatus of the user device 1. For example, the user can be notified that the historical user is off-line or the first interaction information is undeliverable, etc. Similarly, the twelfth apparatus of the network device 2 can detect whether the connection status between the historical user and the target wireless access point to check whether the connection is disconnected. When the connection is disconnected, the first interaction information can be ignored and reported to the user by the twelfth apparatus of the network device 2.

Figure 5:
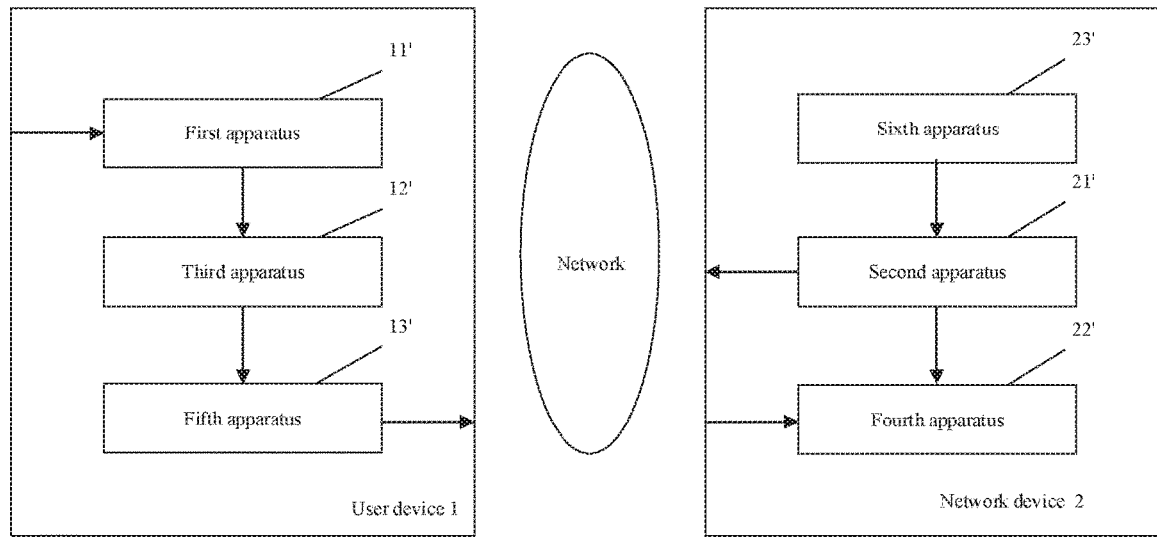
FIG. 5 is a schematic diagram showing a device for acquiring user feedback information of a wireless access point according to another preferred embodiment of the present application.

In a preferred embodiment, as shown in FIG. 5, the first apparatus, second apparatus, third apparatus, fourth apparatus, and fifth apparatus in FIG. 5 are identical or basically the same as the first apparatus, second apparatus, third apparatus, fourth apparatus, and fifth apparatus in the embodiment shown by FIG. 4, thus the apparatuses are not repeated herein, and are merely incorporated herein by reference. Preferably, the network device 2 further includes a sixth apparatus. The sixth apparatus of the network device 2 determines the feedback prompt information regarding the target wireless access point based on relevant information of the target wireless access point. Wherein, the second apparatus is configured to send the feedback prompt information to the user device 1 through the wireless connection between the user device 1 and the target wireless access point by the network device 2. Preferably, the relevant information of the target wireless access point includes at least one of the following: bandwidth information of the target wireless access point; security information of the target wireless access point; historical feedback information of the target wireless access point; and current connection quantity information of the target wireless access point. In the present embodiment, the sixth apparatus of the network device 2 first determines the feedback prompt information regarding the target wireless access point according to the relevant information of the target wireless access point, i.e. different feedback prompt information is matched for respective wireless access point according to the relevant information of each wireless access point. For example, the sixth apparatus of the network device 2 may perform comprehensive evaluation on the target wireless access point according to the bandwidth information, security information, historical feedback information, current connection quantity information, and the like of the target wireless access point. The sixth apparatus of the network device 2 may contain the comprehensive evaluation information in the feedback prompt information regarding the target wireless access point, or directly configure different feedback prompt information according to the comprehensive evaluation information. For example, when the feedback prompt information contains the rewarding button, the amount of money for rewarding the wireless access point with higher comprehensive evaluation is configured to be relatively higher, and the amount of money for rewarding the wireless access point with lower comprehensive evaluation is configured to be relatively lower. For example, a rewarding button for ten yuan may be configured for the wireless access point with higher comprehensive evaluation, and a rewarding button for five yuan may be configured for the wireless access point with lower comprehensive evaluation, etc. The rewarding page may be configured in real time according to the real-time relevant information of the access point, or may be configured according to historical relevant information of the access point. Herein, the amount of money for rewarding is merely an example and not intended to limit the present application. Or, the relevant information of the target wireless access point is directly contained in the feedback prompt information for user's reference.

Preferably, the user device further includes a thirteenth apparatus and a fifteenth apparatus, and the network device 2 further includes a fourteenth apparatus. Specifically, the fourteenth apparatus of the network device 2 sends feedback response information to the user device 1 based on the user feedback information. Accordingly, the thirteenth apparatus of the user device 1 receives the feedback response information returned by the network device 2 based on the user feedback information. Further, the fifteenth apparatus of the user device 1 updates and presents the feedback prompt information on the user device 1 according to the feedback response information. In the present embodiment, after the network device 2 receives the user feedback information sent by the user device 1, the fourteenth apparatus of the network device 2 sends the corresponding feedback response information to the user device 1. Accordingly, the thirteenth apparatus of the user device 1 receives the feedback response information. Further, the fifteenth apparatus of the user device 1 updates and presents the feedback prompt information on the user device 1 according to the feedback response information. For example, the feedback response information is successful receiving, or the latest feedback prompt information after receiving the user feedback information sent by the user device 1. For example, if the feedback prompt information is the rewarding page, while the user account picture will be shown on the rewarding page after the feedback response information is successfully sent to the network device 2 by the user, then, after the user successfully rewards the wireless access point, the user account picture will be shown on the rewarding page, and other users may also submit user feedback information at the same period of time. Thus, the user device 1 may update and present the rewarding page.

Figure 6:
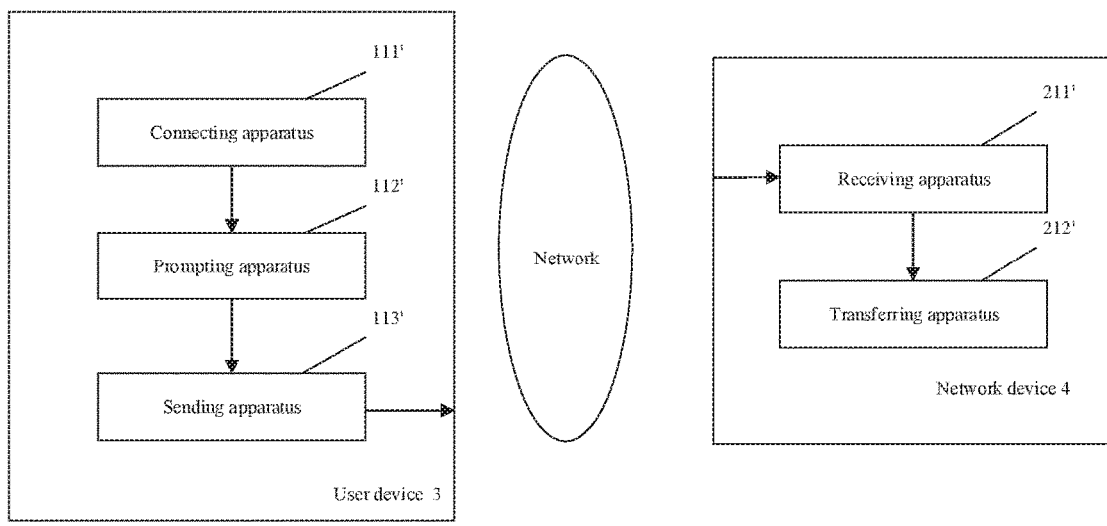
FIG. 6 is a schematic diagram showing a device for rewarding a wireless access point according to another preferred embodiment of the present application.

As shown in FIG. 6, a user device 3 and a network device 4 for rewarding the wireless access point are further provided according to another aspect of the present application. Wherein, the user device 3 and the network device 4 coordinate with each other to realize the rewarding of the wireless access point.

Specifically, in the present embodiment, a connecting apparatus of the user device establishes the wireless connection between the user device 3 and the target wireless access point. Further, a prompting apparatus of the user device 3 presents the rewarding prompt information regarding the target wireless access point on the user device 3. Further, a sending apparatus of the user device 3 sends the rewarding operation information regarding the target wireless access point submitted by the user according to the rewarding prompt information to the corresponding network device 4 through the wireless connection. Accordingly, a receiving apparatus of the network device 4 receives the rewarding operation information regarding the target wireless access point submitted by the user device 3. Further, a transferring apparatus of the network device 4 transfers the rewarding resource from a corresponding account of the user device 3 to a corresponding account of the target wireless access point according to the rewarding operation information.

In the present embodiment, the connecting apparatus of the user device 3 establishes the wireless connection between the user device 3 and the target wireless access point. Herein, the user device 3 includes but is not limited to any type of mobile electronic product that can perform man-machine interaction with the users by a touch panel, such as smart phones, tablet computers, etc. The mobile electronic products may adopt any operating system, such as android operating system, iOS operating system, etc. The user device 3 can establish a wireless connection to a wireless access point. Further, the prompting apparatus of the user device 3 presents the rewarding prompt information regarding the target wireless access point on the user device 3. Herein, the rewarding prompt information is configured to prompt the user to reward the target wireless access point. For example, the rewarding prompt information is a rewarding button, and the rewarding button may set with a predetermined amount of money in advance. The user may reward the target wireless access point with corresponding amount of money by the rewarding button.

Preferably, the device further includes: a connection sending apparatus (not shown). The connection sending apparatus of the user device 3 sends information of the user device 3 being successfully connected to the target wireless access point to the corresponding network device 4 through the wireless connection. Accordingly, a connection receiving apparatus of the network device 4 receives the information of successful connection. Further, a rewarding sending apparatus (not shown) sends the rewarding prompt information regarding the target wireless access point to the user device based on the information of successful connection. Accordingly, the user device 3 receives the rewarding prompt information. The prompting apparatus is configured to present the feedback prompt information on the user device 3. Specifically, after a wireless connection is established between the user device 3 and the target wireless access point, the connection sending apparatus can send the information of successful connection to the network device 4. After the rewarding sending apparatus of the network device 4 receives the information, the rewarding prompt information regarding the target wireless access point is sent to the user device 3. Specifically, the network device 4 sends the rewarding prompt information to the user device 3 according to respective communication protocol through the wireless connection established between the user device 3 and the network device 4.

Further, the sending apparatus of the user device 3 sends the rewarding operation information regarding the target wireless access point submitted according to the rewarding prompt information by the user to a corresponding network device 4 through the wireless connection. Accordingly, the receiving apparatus of the network device 4 receives the rewarding operation information regarding the target wireless access point submitted by the user device 3. Herein, the network device 4 includes but is not limited to a computer, a network host, a single network server, a cloud which consists of multiple network server sets or multiple servers. Herein, the cloud consists of a mass of computers or network servers based on cloud computing. Wherein, the cloud computing is one kind of distributed computing, and the cloud is a virtual supercomputer which consists of a group of loosely coupled computer sets. The rewarding operation information includes a specific rewarding information of a corresponding user for notifying the network device 4, and attribute information corresponding to the user. For example, the information related to the amount of money issued by the user and the user account information, etc.

Further, the transferring apparatus of the network device 4 transfers the corresponding rewarding resource from the corresponding account of the user device 3 to the corresponding account of the target wireless access point according to the rewarding operation information. Specifically, the rewarding resource includes information of rewarding the target wireless access point by the user. For example, the rewarding resource is five yuan. Specifically, for example, a user rewards the target wireless access point with five yuan. Accordingly, after receiving the rewarding operation information, the network device 4 will transfer five yuan from the user's account corresponding to the user device 3 to the corresponding account of the target wireless access point to achieve the rewarding of the target wireless access point.

Preferably, the transferring apparatus includes a first transferring unit (not shown) configured to send resource transferring prompt information to the user device 3 according to the rewarding operation information. Specifically, the resource transferring prompt information includes the rewarding resource corresponding to the rewarding operation information and the corresponding account of the target wireless access point used to receive the rewarding resource. Accordingly, a prompt receiving apparatus of the user device 3 receives the resource transferring prompt information. Specifically, the resource transferring prompt information is used to prompt the user corresponding to the user device 3 that the rewarding resource is to be transferred. For example, when a user rewarded the target wireless access point with five yuan, the network device 4 may prompt the user that five yuan will be transferred from the user's account to the corresponding account of the target wireless access point. Further, a confirmation sending apparatus of the user device 3 sends confirmation information regarding the resource transferring prompt information from the user to the network device 4 through the wireless connection. Specifically, the confirmation information is used to confirm the corresponding resource transferring prompt information to ensure the security of the user's account. For example, the confirmation information is "Transferring five yuan to the account of the target wireless access point, Yes or No?" the user may click on either "Yes" or "No" according to the actual situation. Further, after a second transferring unit (not shown) receives the confirmation information regarding the resource transferring prompt information submitted by the user device 3, the second transferring unit of the network device 4 transfers the rewarding resource from the corresponding account of the user device to the corresponding account of the target wireless access point. For example, after a certain user rewarded the target wireless access point with ten yuan, the network device 4 will notify the user to confirm whether to transfer ten yuan from the account of the user to the account corresponding to the target wireless access point. After confirming by the user, the second transferring unit of the network device 4 transfers ten yuan from the account of the user to the account corresponding to the target wireless access point.

Compared with the prior art, according to the present application, feedback prompt information regarding the target wireless access point to which the user device is connected is presented on the user device, and the user feedback information regarding the target wireless access point, which is submitted according to the feedback prompt information by the user, is sent to the corresponding network device. In this way, users are able to give feedback to the wireless access points, so that the wireless access points in poor condition can be improved or the wireless access points in good condition can be encouraged or rewarded. Also, owners will be encouraged to share their wireless access points.

Furthermore, according to the present application, the feedback prompt information and the historical feedback information can also be presented on the user device. Wherein, user information of historical users corresponding to the historical feedback information is displayed according to the connection status between the historical users and the target wireless access point. In this way, the user using the target access point not only can acquire the feedback information given to the wireless access point by other historical users, but also can learn the connection status between the historical users and the target wireless access point, so as to facilitate the communication with the historical users.

Furthermore, according to the present application, first interaction information sent to the historical user corresponding to the historical feedback information by the user may further be acquired. Then, the first interaction information is sent to the network device. Further, the first interaction information is sent to the historical user by the network device. In this way, an exchange of information among users gave feedback and an information sharing are realized, thereby better improving the user experience.

In addition, according to the present application, after the wireless connection between the user device and the target wireless access point is established, the rewarding prompt information regarding the target wireless access point is presented on the user device. Further, the rewarding operation information regarding the target wireless access point submitted by the user according to the rewarding prompt information is sent to the corresponding network device through the wireless connection. Accordingly, the network device receives the rewarding operation information. Further, according to the rewarding operation information, the corresponding rewarding resource is transferred from the corresponding account of the user device to the corresponding account of the target wireless access point by the network device. In this way, the user can reward the target wireless access point that is connected by the user, and it is convenient and fast. Also, the owners are encouraged to share their wireless access points.

Various aspects of various embodiments are claimed in the claims. These and other aspects of the various embodiments are described in the following numbered items.

1. A method for acquiring user feedback information of a wireless access point on a user device, wherein the method includes:

B. presenting feedback prompt information regarding the target wireless access point to which the user device is connected on the user device, wherein the feedback prompt information includes rewarding prompt information; and C. sending the user feedback information regarding the target wireless access point, which is submitted according to the feedback prompt information by the user, to the corresponding network device, wherein the user feedback information includes rewarding operation information regarding the target wireless access point submitted by the user according to the rewarding prompt information.

2. The method according to item 1 further includes:

A. receiving the feedback prompt information regarding the target wireless access point sent by the corresponding network device through the wireless connection between the user device and the target wireless access point;

wherein step B includes:

presenting the feedback prompt information on the user device.

3. The method according to item 2, wherein step A includes:

after the wireless connection between the user device and the target wireless access point is successfully established, sending, to the corresponding network device, successful connection information indicating a successful connection to the target wireless access point through the wireless connection by the user device; and receiving the feedback prompt information regarding the target wireless access point sent by the network device based on the successful connection information through the wireless connection 4. The method according to item 2, wherein step A further includes:

receiving historical feedback information regarding the target wireless access point sent by the network device through the wireless connection;

wherein, step B includes:

presenting the feedback prompt information and the historical feedback information on the user device.

5. The method according to item 4, wherein step B includes:

presenting the feedback prompt information and the historical feedback information on the user device, wherein user information of historical users corresponding to the historical feedback information is displayed according to connection status between the historical users and the target wireless access point.

6. The method according to item 4 or 5 further includes:

R. acquiring first interaction information sent to the historical user corresponding to the historical feedback information by the user; and S. sending the first interaction information to the network device.

7. The method according to item 6, wherein step S includes:

sending the first interaction information to the network device when the connection status between the historical user and the target wireless access point is stay connected.

8. The method according to item 7 further includes:

ignoring the first interaction information and reporting to the user when the connection status between the historical user and the target wireless access point is disconnected.

9. The method according to item 1 further includes:

receiving feedback response information returned by the network device based on the user feedback information; and updating and presenting the feedback prompt information on the user device according to the feedback response information.

10. The method according to item 1, wherein the user feedback information includes at least one of the following items:

usage evaluation information to the target wireless access point; and payment information to the target wireless access point.

11. The method according to item 1, wherein step B includes:
presenting the feedback prompt information on the user device when predetermined feedback triggering conditions are satisfied.

12. The method according to item 11, wherein the feedback triggering conditions include at least one of the following conditions:
the accumulated duration of the user device being connected to the target wireless access point is equal to or greater than a predetermined usage duration threshold;
the accumulated communication data usage of the user device through the wireless connection is equal to or greater than a predetermined data usage threshold;
an application that communicates through the wireless connection is opened on the user device; and
an application that communicates through the wireless connection is closed on the user device.

13. A method for acquiring user feedback information of the wireless access point on the network device, wherein the method includes:
b. receiving the user feedback information regarding the target wireless access point submitted by the user device, wherein the user feedback information includes rewarding operation information regarding the target wireless access point.

14. The method according to item 13 further includes:
a. sending the feedback prompt information regarding the target wireless access point to the user device through the wireless connection between the user device and the target wireless access point, wherein the feedback prompt information includes rewarding prompt information;
wherein step b includes:
receiving the user feedback information regarding the target wireless access point submitted by the user device based on the feedback prompt information, wherein the user feedback information includes the rewarding operation information regarding the target wireless access point submitted by the user device according to the rewarding prompt information.

15. The method according to item 14, wherein, step a includes:
receiving successful connection information indicating a successful connection to the target wireless access point sent by the user device; and
sending the feedback prompt information regarding the target wireless access point to the user device based on the successful connection information.

16. The method according to item 14 further includes:
determining the feedback prompt information regarding the target wireless access point based on relevant information of the target wireless access point;
wherein step a includes:
sending the feedback prompt information to the user device through the wireless connection between the user device and the target wireless access point.

17. The method according to item 16, wherein the relevant information of the target wireless access point includes at least one of the following items:
bandwidth information of the target wireless access point;
security information of the target wireless access point;
historical feedback information of the target wireless access point; and
current connection quantity information of the target wireless access point.

18. The method according to item 14, wherein step a further includes:
sending historical feedback information regarding the target wireless access point to the user device through the wireless connection.

19. The method according to item 18 further includes:
r. receiving first interaction information to a historical user corresponding to historical feedback information from the user submitted by the user device; and
s. providing the first interaction information to a device corresponding to the historical user.

20. The method according to item 19, wherein step s includes:
providing the first interaction information to the device corresponding to the historical user when the connection status between the historical user and the target wireless access point is stay connected.

21. The method according to item 20 further includes:
ignoring the first interaction information and giving feedback to the user device when the connection status between the historical user and the target wireless access point is disconnected.

22. The method according to item 13 further includes:
sending feedback response information to the user device based on the user feedback information.

23. A user device for acquiring user feedback information of a wireless access point, wherein the device includes:
a third apparatus, configured to present feedback prompt information regarding the target wireless access point to which the user device is connected on the user device, wherein the feedback prompt information includes rewarding prompt information; and
a fifth apparatus, configured to send user feedback information regarding the target wireless access point, which is submitted according to the feedback prompt information by the user, to the corresponding network device, wherein, the user feedback information includes rewarding operation information regarding the target wireless access point submitted by the user according to the rewarding prompt information.

24. The device according to item 23 further includes:
a first apparatus, configured to receive the feedback prompt information regarding the target wireless access point sent by the corresponding network device through the wireless connection between the user device and the target wireless access point;
wherein, the third apparatus is configured to:
present the feedback prompt information on the user device.

25. The device according to item 24, wherein the first device includes:
a first apparatus, configured to send, to the corresponding network device, successful connection information indicating successful connection to the target wireless access point through a wireless connection after the wireless connection between the user device and the target wireless access point is successfully established; and
a third apparatus, configured to receive the feedback prompt information regarding the target wireless access point sent by the network device based on the successful connection information through the wireless connection.

26. The device according to item 24, wherein the first apparatus further includes:
a fifth unit, configured to receive historical feedback information regarding the target wireless access point sent by the network device through the wireless connection;
wherein, the third apparatus is configured to:

present the feedback prompt information and the historical feedback information on the user device.

27. The device according to item 26, wherein the third apparatus is configured to:
present the feedback prompt information and the historical feedback information on the user device, wherein, user information of historical users corresponding to the historical feedback information is displayed according to connection status between the historical users and the target wireless access point.

28. The device according to item 26 or 27 further includes:
a seventh apparatus, configured to acquire first interaction information sent to the historical user corresponding to the historical feedback information by the user; and
a ninth apparatus, configured to send the first interaction information to the network device.

29. The device according to item 28, wherein, the ninth apparatus is configured to:
send the first interaction information to the network device when the connection status between the historical user and the target wireless access point is stay connected.

30. The device according to item 29 further includes:
an eleventh apparatus, configured to ignore the first interaction information and report to the user when the connection status between the historical user and the target wireless access point is disconnected.

31. The device according to item 23 further includes:
a thirteenth apparatus, configured to receive feedback response information returned by the network device based on the user feedback information; and
a fifteenth apparatus, configured to update and present the feedback prompt information on the user device according to the feedback response information.

32. The device according to item 23, wherein the user feedback information includes at least one of the following items:
usage evaluation information to the target wireless access point; and
payment information to the target wireless access point.

33. The device according to clause 23, wherein the third apparatus is configured to:
present the feedback prompt information on the user device when predetermined feedback triggering conditions are satisfied.

34. The device according to item 33, wherein the feedback triggering conditions include at least one of the following conditions:
an accumulated duration of the user device being connected to the target wireless access point is equal to or greater than a predetermined usage duration threshold;
an accumulated communication data usage of the user device through the wireless connection is equal to or greater than a predetermined data usage threshold;
an application that communicates through the wireless connection is opened on the user device; and
an application that communicates through the wireless connection is closed on the user device.

35. A network device for acquiring user feedback information of a wireless access point, wherein the device includes:
a fourth apparatus, configured to receive the user feedback information regarding the target wireless access point submitted by the user device, wherein the user feedback information includes rewarding operation information regarding the target wireless access point.

36. The network device according to item 35 further includes:
a second apparatus, configured to send the feedback prompt information regarding the target wireless access point to the user device through the wireless connection established between the user device and the target wireless access point, wherein the feedback prompt information includes rewarding prompt information;
wherein, the fourth apparatus is configured to:
receive the user feedback information regarding the target wireless access point submitted by the user device based on the feedback prompt information, wherein, the user feedback information includes the rewarding operation information regarding the target wireless access point submitted by the user device according to the rewarding prompt information.

37. The network device according to item 36, wherein, the second apparatus includes:
a second unit, configured to receive successful connection information indicating a successful connection to the target wireless access point sent by the user device; and
a fourth unit, configured to send the feedback prompt information regarding the target wireless access point to the user device based on the successful connection information.

38. The network device according to item 36 further includes:
a sixth apparatus, configured to determine the feedback prompt information regarding the target wireless access point based on relevant information of the target wireless access point;
wherein, the second apparatus is configured to:
send the feedback prompt information to the user device through the wireless connection between the user device and the target wireless access point.

39. The network device according to item 38, wherein, the relevant information of the target wireless access point includes at least one of the following items:
bandwidth information of the target wireless access point;
security information of the target wireless access point;
historical feedback information of the target wireless access point; and
current connection quantity information of the target wireless access point.

40. The network device according to item 36, wherein, the second apparatus further includes:
a sixth unit, configured to send historical feedback information regarding the target wireless access point to the user device through the wireless connection.

41. The network device according to item 40 further includes:
an eighth apparatus, configured to receive first interaction information to the historical user corresponding to the historical feedback information from the user, wherein the first interaction information is submitted by the user device; and
a tenth apparatus, configured to provide the first interaction information to the device corresponding to the historical user.

42. The network device according to item 41, wherein, the tenth apparatus is configured to:
provide the first interaction information to the device corresponding to the historical user when the connection status between the historical user and the target wireless access point is stay connected.

43. The network device according to item 42 further includes:
a twelfth apparatus, configured to ignore the first interaction information and give feedback to the user device when the connection status between the historical user and the target wireless access point is disconnected.

44. The network device according to clause 36 further includes:
a fourteenth apparatus, configured to send feedback response information to the user device based on the user feedback information.

45. A system for acquiring user feedback information of a wireless access point, wherein the system includes the user device according to any one of items 23 to 34 and the network device according to any one of items 35 to 44.

It is obvious to those skilled in the art that the present invention is not limited to the details of the above-described exemplary embodiments, and the present invention can be implemented in other specific forms without departing from the spirit or essential characteristics of the present invention. Thus, these embodiments should all be considered as illustrative and nonrestrictive from all aspects. The scope of the present invention is defined by the appended claims instead of the above descriptions. Therefore, all changes falling within the meaning and scope of equivalent elements of the claims are included in the scope of the present invention. Any reference designator in the claims should not be construed as limiting the involved claims. In addition, it is to be understood that the word "comprising" does not exclude other elements or steps, and singularity does not exclude plurality. A plurality of units or apparatuses recited in the device claims may also be implemented by one unit or apparatus by software or hardware. Terms of first, second and the like are used to denote names and do not denote any particular order.

What is claimed is:

1. A method for rewarding a wireless access point on a user device, comprising:
establishing a wireless connection between the user device and a target wireless access point;
sending to a corresponding network device successful connection information indicating a successful connection to the target wireless access point through the wireless connection;
receiving rewarding prompt information regarding the target wireless access point through the wireless connection, wherein the rewarding prompt information is sent by the network device based on the successful connection information and is a rewarding page for a user to reward the target wireless access point, wherein the rewarding page comprises a rewarding button for a fixed amount of money, a like button, a grade input box, and a money amount input box for rewarding;
presenting the rewarding prompt information regarding the target wireless access point on the user device to allow the user to pay money to reward the target wireless point and give a like or a grade; and
sending rewarding operation information regarding the target wireless access point to a corresponding network device through the wireless connection, wherein the rewarding operation information comprises an amount of money and giving a like or a grade, and is submitted by the user according to the rewarding prompt information,
wherein when a predetermined feedback triggering condition is satisfied, feedback prompt information is presented on the user device, and wherein the feedback triggering condition comprises at least one of an accumulated usage duration of the user device being connected to the target wireless access point exceeds a predetermined usage threshold, an accumulated communication data usage of the user device wireless connection exceeds a predetermined data usage threshold, and a combination thereof.

2. The method according to claim 1, further comprising:
receiving resource transferring prompt information sent by the network device based on the rewarding operation information, wherein the resource transferring prompt information comprises a rewarding resource corresponding to the rewarding operation information and a corresponding account of the target wireless access point configured to receive the rewarding resource; and
sending confirmation information regarding the resource transferring prompt information from the user to the network device through the wireless connection.

3. A method for rewarding a wireless access point on a network device, comprising:
sending rewarding operation information regarding a target wireless access point to a corresponding network device through a wireless connection, wherein the rewarding operation information comprises an amount of money and giving a like or a grade, and is submitted by a user according to a rewarding prompt information,
receiving the rewarding operation information regarding the target wireless access point submitted by a user device; and
transferring a corresponding rewarding resource from a corresponding account of the user device to a corresponding account of the target wireless access point according to the rewarding operation information;
receiving successful connection information indicating a successful connection to the target wireless access point sent by the user device;
sending the rewarding prompt information regarding the target wireless access point to the user device based on the successful connection information and to allow the user to pay money to reward the target wireless point and give a like or a grade;
wherein, the step of receiving the rewarding operation information regarding the target wireless access point submitted by the user device comprises:
receiving the rewarding operation information regarding the target wireless access point submitted by the user device based on the rewarding prompt information, wherein the rewarding prompt information is a rewarding page for the user to reward the target wireless access point and the rewarding page comprises a rewarding button for a fixed amount of money, a like button, a grade input box, and a money amount input box for rewarding,
wherein when a predetermined feedback triggering condition is satisfied, feedback prompt information is presented on the user device, and wherein the feedback triggering condition comprises at least one of an accumulated usage duration of the user device being connected to the target wireless access point exceeds a predetermined usage threshold, an accumulated communication data usage of the user device wireless connection exceeds a predetermined data usage threshold, and a combination thereof.

4. The method according to claim 3, wherein the step of transferring the corresponding rewarding resource from the corresponding account of the user device to the corresponding account of the target wireless access point according to the rewarding operation information comprises:

sending resource transferring prompt information to the user device according to the rewarding operation information, wherein the resource transferring prompt information comprises a rewarding resource corresponding to the rewarding operation information and a corresponding account of the target wireless access point configured to receive the rewarding resource; and transferring the rewarding resource from the corresponding account of the user device to the corresponding account of the target wireless access point in response to a reception of confirmation information regarding the resource transferring prompt information submitted by the user device.

5. An apparatus, comprising:

a processor;

a memory storing instructions thereon, when executed by the processor, cause the processor to:

establish a wireless connection between a user device and a target wireless access point;

sending to a corresponding network device successful connection information indicating a successful connection to the target wireless access point through the wireless connection;

receiving rewarding prompt information regarding the target wireless access point through the wireless connection, wherein the rewarding prompt information is sent by the network device based on the successful connection information and is a rewarding page for a user to reward the target wireless access point, wherein the rewarding page comprises a rewarding button for a fixed amount of money, a like button, a grade input box, and a money amount input box for rewarding;

present the rewarding prompt information regarding the target wireless access point on the user device to allow the user to pay money to reward the target wireless point and give a like or a grade; and send rewarding operation information regarding the target wireless access point to a corresponding network device through the wireless connection, wherein the rewarding operation information comprises an amount of money and giving a like or a grade, and is submitted by the user according to the rewarding prompt information, wherein when a predetermined feedback triggering condition is satisfied, feedback prompt information is presented on the user device, and wherein the feedback triggering condition comprises at least one of an accumulated usage duration of the user device being connected to the target wireless access point exceeds a predetermined usage threshold, an accumulated communication data usage of the user device wireless connection exceeds a predetermined data usage threshold, and a combination thereof.

* * * * *